United States Patent [19]

Shimizu et al.

[11] 4,389,052
[45] Jun. 21, 1983

[54] OIL SEAL SYSTEM FOR SHAFT OF TURBOCHARGER

[75] Inventors: Masami Shimizu, Chiba; Junji Yasunobe, Yokohama, both of Japan

[73] Assignee: Ishikawajima-Harima Jukogyo Kabushiki Kaisha, Tokyo, Japan

[21] Appl. No.: 160,961

[22] Filed: Jun. 19, 1980

[30] Foreign Application Priority Data

Jul. 10, 1979 [JP] Japan ............................ 54-94989[U]

[51] Int. Cl.³ ............................................. F16J 15/40
[52] U.S. Cl. ...................................... 277/67; 277/59; 277/68; 415/111
[58] Field of Search .................. 277/3, 27, 67–69, 277/59, 13, 14 R, 14 V; 415/111, 112

[56] References Cited

U.S. PATENT DOCUMENTS

| 2,266,407 | 12/1941 | Bruestle | 277/67 X |
| 2,812,196 | 11/1957 | Atkinson | 277/68 |
| 2,891,808 | 6/1959 | Richardson | 277/67 X |
| 3,476,396 | 11/1969 | Buhl | 277/67 X |
| 4,171,137 | 10/1979 | Aizu et al. | 415/111 X |

FOREIGN PATENT DOCUMENTS

| 406192 | 2/1934 | United Kingdom | 277/67 |
| 662150 | 12/1951 | United Kingdom | 277/67 |
| 817432 | 7/1959 | United Kingdom | 277/67 |

Primary Examiner—Robert S. Ward, Jr.
Attorney, Agent, or Firm—B. B. Olive

[57] ABSTRACT

An oil seal system for the shaft of a turbocharger has an oil-trapping chamber formed by an oil thrower, thrust metal, and seals arranged so as to prevent the leakage of the lubricant into the blower.

4 Claims, 3 Drawing Figures

OIL SEAL SYSTEM FOR SHAFT OF TURBOCHARGER

BACKGROUND OF THE INVENTION

The present invention relates to an oil seal arrangement for the shaft of a turbocharger.

In FIG. 1 is shown a prior art turbocharger. The lubricant is forcibly charged through an oil port e so as to lubricate a floating metal b, a thrust bushing c and a thrust metal d which support a turbine shaft a rotating at a high speed. The pressure at the rear of a blower impeller f becomes negative depending on its rotational speed and operating conditions. As a result, the lubricant is sucked into the blower through very small spaces between the component parts so that it is entrained as oil mist in the air discharged from the blower. The oil mist adversely affects the performance and maintenance of the turbocharger and its associated engine.

In order to overcome this problem, the prior art turbocharger is provided with an oil thrower g, a seal ring j interposed between the oil thrower g and a seal plate h on the side of the bearing and another seal rink k interposed between the oil thrower g and a seal plate i on the side of the impeller, thereby preventing the leakage of the lubricant into the blower. More specifically, the lubricant is first thrown under the centrifugal force of the oil thrower g and the remaining oil which has not been thrown is sealed by the seal rings j and k. The lubricant which has been thrown and sealed in the manner described above is directed toward an outlet l along the surfaces of the seal plates i and h.

The pattern of the thrown oil changes over a wide range depending upon the rotational speed of the turbine shaft and the flow rate of the lubricant forced to flow through the oil inlet e. That is, the thrown oil is in the form of drops, film, sawteeth, mist containing air bubbles and combinations thereof. The thrown oil impinges against the surfaces of the component parts and drops along them. Sometimes the flow of the oil is prevented by the oil films formed on the surfaces of the component parts. Thus the lubricant is discharged to the exterior without leaking into the blower. However, it occurs very frequently in practice that the discharged lubricant is sucked into the blower because of careless handling. Therefore the complete prevention of the lubricant leakage into the blower cannot be attained by the prior art oil seal system. In addition, the prior art system cannot seal the oil whose conditions change in various manners.

It is therefore the primary object of the present invention to provide an oil seal system for the shaft of a turbocharger which can accomplish the complete oil throwing so as to prevent any leakage of the lubricant to a blower.

The present invention will become apparent from the following description of a preferred embodiment thereof taken in conjunction with the accompanying drawings.

DETAILED DESCRIPTION OF THE PREFERRED EMBODIMENT

Figure 1:
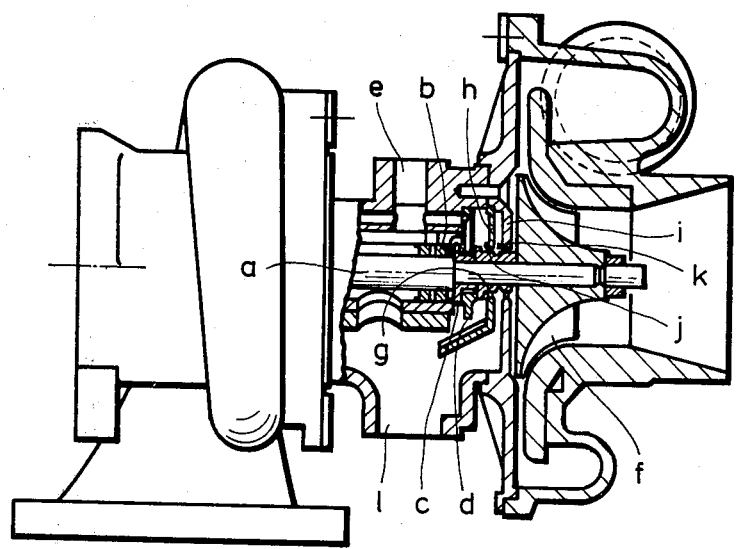
FIG. 1 is a side view, partly in section, of a prior art turbocharger.
Figure 2:
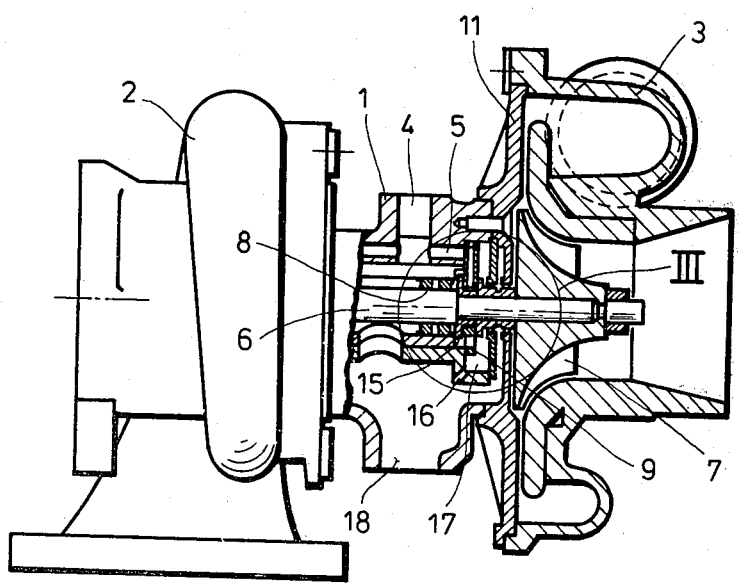
FIG. 2 is a side view, partly in section, of a turbocharger incorporating an oil seal system in accordance with the present invention.

One end of a bearing casing 1 is mounted on a turbine casing 2 while the other end is mounted on a blower casing 3 through a seal plate 11. A combined turbine and compressor shaft 6, which is fitted with a floating metal 8, carries at one end a turbine wheel (not shown) and a blower impeller 7 at the other end so that the blower or compressor can be driven by an exhaust turbine.

Figure 3:
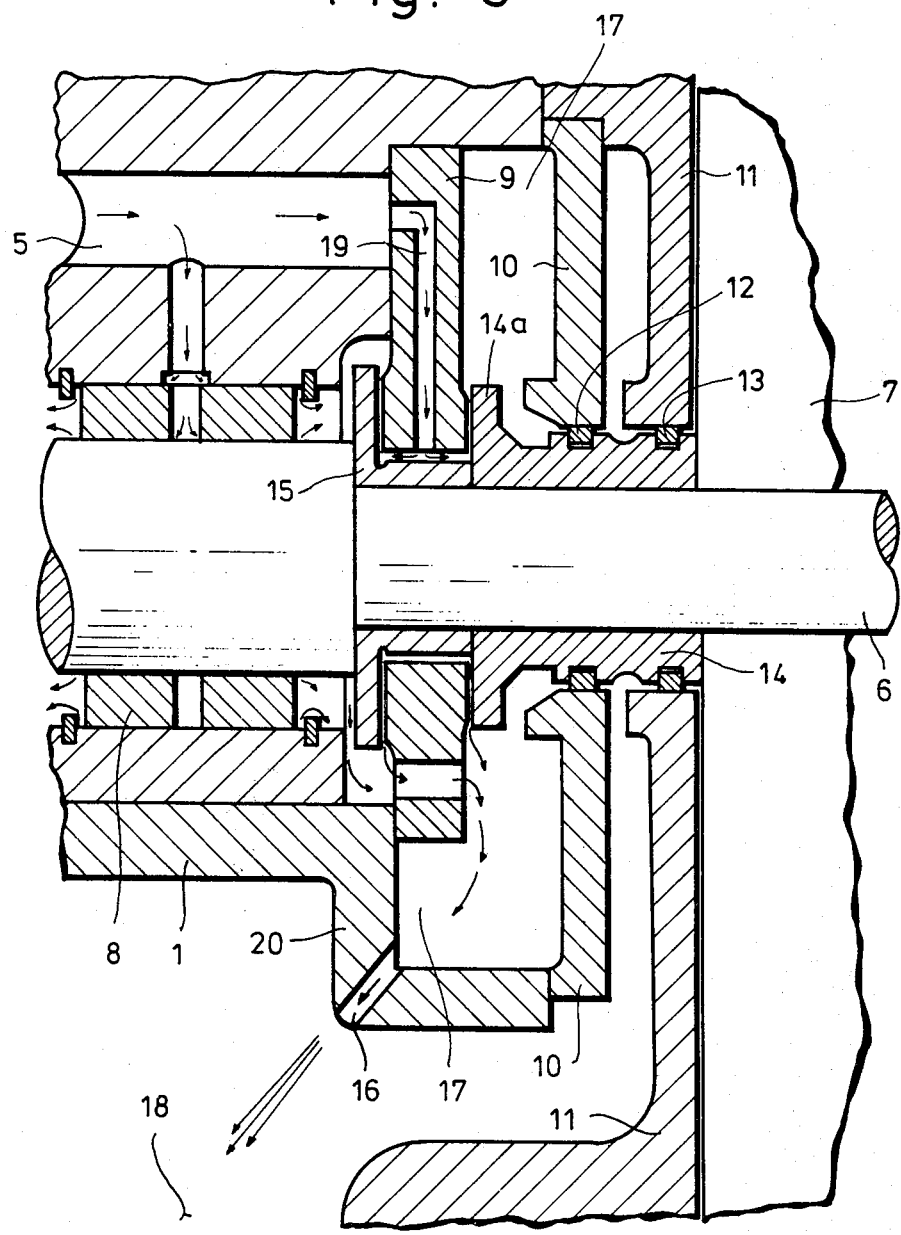
FIG. 3 is a sectional view, on enlarged scale, of a portion III encircled in FIG. 2.

As best shown in FIG. 3, a thrust bushing 15 is securely fitted over the combined shaft 6 adjacent to the floating metal 8 and resides between the latter and the blower impeller 7 and is pressed against a shoulder on the combined shaft 6. An oil thrower 14 is fitted over the combined shaft 6 between the blower impeller 7 and the thrust bushing 15. One end of the oil thrower 14 is pressed against the thrust bushing 15 while the other end thereof is pressed against the rear surface of the blower impeller 7, whereby the oil thrower 14 can carry the thrust loads. A thrust metal 9 which is non-rotatably fitted over the thrust bushing 15, has a radial oil passageway 19 in communication with an axial oil passageway 5. Seal rings 12 and 13, which are fitted over the reduced diameter portion of the oil thrower 14 are interposed between the latter and seal plates 10 and 11, respectively. A wall 20, which is extended downward from the bearing casing 1, is formed with an oil discharge port 16 directed toward an oil discharge outlet 18. The free end of the extended wall 20 is pressed against the seal plate 10. Therefore, an oil trapping chamber 17 is defined by a portion of the bearing casing 1, the thrust metal 9, the oil thrower 14, the seal plate 10 and the seal ring 12. The flange 14a of the oil thrower 14 is extended into the oil trapping chamber 17.

The lubricant which is thrown and scattered in random directions is trapped in the chamber 17 and accumulated at the bottom thereof. Thereafter the lubricant is discharged through the discharge port 16 toward the outlet 18. In other words, the thrown oil is trapped and forced to flow in the direction in which the discharged oil is free from the suction of the blower.

It is to be understood that the present invention is not limited to the embodiment described above and that various modifications may be effected without leaving the true spirit of the present invention.

The novel effects, features and advantages of the oil seal system in accordance with the present invention may be summarized as follows:

(I) The lubricant which is thrown and scattered in random forms or shapes and in random directions can be trapped in the chamber 17. As a result, regardless of the patterns of the thrown oil droplets or the like, the lubricant will be free from the suction forces exerted from the blower.

(II) The oil trapped in the chamber 17 is directed through the discharge port 16 to the outlet 18. In the prior art oil seal system, the oil flowing toward the outlet is adversely affected by the thrown oil droplets or the like. However, according to the present invention such adverse effects can be completely eliminated. As a result, the oil which is being discharged is free from the suction force exerted from the blower.

(III) Because of (I) and (II), the entrainment of oil mist in the air discharged from the blower can be completely avoided.

What is claimed is:

1. In an oil seal system for the shaft of a turbocharger having a turbine and impeller mounted thereon in axially-spaced relation and an oil-trapping chamber formed by components thereof, in combination:
   (a) a combined turbine-impeller mounting shaft having a shoulder formed thereon inward from the impeller mounting portion thereof;
   (b) a bearing casing surrounding said shoulder and portions of said shaft on either side thereof;
   (c) a seal plate mounted to seal said casing and positioned between said impeller and said shoulder;
   (d) an oil thrower fitted on said shaft and having a first portion within said seal plate, a second portion extending axially towards said shoulder and having an oil-throwing flange formed thereon spaced outwardly from said shoulder;
   (e) a seal ring interposed between said oil thrower and said seal plate;
   (f) a thrust bushing fitted on said shaft and having one end abutting said shoulder and an opposite end abutting said oil-thrower flange; and
   (g) a thrust metal fixedly secured to said casing and surrounding in radially spaced relation a portion of said thrust bushing between said shoulder and said flange, said thrust metal having channels formed therein communicating with an oil supply enabling a flow of oil from such supply to flow on selected surfaces of said thrust bushing and said oil thrower and from such surfaces flow to a said oil trapping chamber below said oil thrower, said trapping chamber being formed by said casing, seal plate, oil thrower, seal ring, and thrust metal and having an oil discharge port extending through the bottom portion thereof with said oil-throwing flange being disposed within said chamber.

2. In a oil seal system as claimed in claim 1 wherein said thrust metal includes one said channel for receiving oil from an oil supply and in which the oil flows in a direction towards and perpendicular to the axis of said shaft and other said channels in which the oil from such supply flows in a direction parallel to the axis of said shaft.

3. In an oil seal system as claimed in claim 1 wherein said oil discharge port is located in said casing and is directed toward an oil discharge outlet located below said casing.

4. In an oil seal system as claimed in claim 1 including a second seal plate located between said first seal plate and said impeller and a second seal ring interposed between said oil thrower and said second seal plate.

* * * * *